(12) United States Patent
Kakivaya et al.

(10) Patent No.: US 7,124,405 B1
(45) Date of Patent: Oct. 17, 2006

(54) CLASS INITIALIZATION METHOD SEMANTICS

(75) Inventors: Gopala Krishna R. Kakivaya, Sammamish, WA (US); Christopher W. Brumme, Mercer Island, WA (US); James S. Miller, Bellevue, WA (US); Vance P. Morrison, Kirkland, WA (US); David S. Mortenson, Redmond, WA (US); Sean E. Trowbridge, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 798 days.

(21) Appl. No.: 09/894,700

(22) Filed: Jun. 28, 2001

(51) Int. Cl.
*G06F 9/43* (2006.01)
*G06F 9/45* (2006.01)

(52) U.S. Cl. ...................... 717/143; 718/100
(58) Field of Classification Search ........ 718/100–102, 718/106–108; 717/140, 143, 144, 148
See application file for complete search history.

(56) References Cited

U.S. PATENT DOCUMENTS 5,999,732 A * 12/1999 Bak et al. .................. 717/148
6,237,043 B1 5/2001 Brown et al. ............... 709/316

OTHER PUBLICATIONS

J. Yantchev et al., May 1989, "Adaptive, low latency, deadlock-free packet routing for networks of processors", IEE Proceedings, 136, 178-186.*
Egon Borger et al., "Initialization Problems for Java", Software—Concepts & Tools, 19: 175-178 (2000).*
Claudio DeMartini et al., "A Deadlock Detection Tool for Concurrent Java Programs", Software—Practice and Experience, 29(7): 577-603 (1999).*
Hauptmann, Steffen, et al.; "Dynamic Software Reconfiguration Keeps Critical Systems Running", *Electronic Design*, vol. 45, No. 6, Mar. 17, 1997, p. 97-106.

* cited by examiner

*Primary Examiner*—Meng-Al T. An
*Assistant Examiner*—Kenneth Tang
(74) *Attorney, Agent, or Firm*—Amin & Turocy, LLP

(57) ABSTRACT

A system and method for mitigating problems associated with automatic execution of initialization code is provided. The system includes an initialization method activator that can call a class initialization method at a predetermined execution point. The system also includes a deadlock analyzer that can determine whether calling the initialization method will create a deadlock, and, if a deadlock is detected that can resolve such a deadlock. The system also includes a semantic analyzing component that can analyze a semantic type associated with the initialization method and a domain uniqueness analyzer that can analyze the uniqueness of the domain with which the class will interact, to facilitate determining where to place code that will check whether a class is initialized, and if the class is not initialized that will invoke the class initializing method.

28 Claims, 13 Drawing Sheets

CLASS INITIALIZATION METHOD SEMANTICS

TECHNICAL FIELD

The present invention relates generally to automatic execution of initialization code and more particularly to a system and method for determining when class initialization methods are executed and for determining the behavior of those methods in various contexts in the presence of class dependency loops in both single and multi-threaded situations.

BACKGROUND OF THE INVENTION

Systems that employ classes may benefit from having a global state associated with such classes initialized to a known and valid state. To facilitate establishing state, classes may employ initialization logic, which may be implemented in an initialization method. Conventionally, such initialization methods are invoked by a user of the class. But deferring initialization to user invocation of initialization methods can create problems. Thus, execution of initialization methods may be migrated from user control to system and/or programmatic control.

To facilitate such control, classes can define special methods that are to be executed automatically by a runtime during class initialization. However, the automatic execution of such special methods can lead to unexpected problems (e.g., delays, deadlocks). Problems like delays and deadlocks that are caused by automatic execution of initialization code can be exacerbated in multi-threaded environments.

Conventionally, runtime environments may be constrained to attempting to run a class initialization method on the first access to a class. Such conventional implementations may rely on a flag to record and/or monitor whether a class initialization method has been run, and thus, whether the class is initialized. But with complex scenarios (e.g., class dependency loops, race conditions) encountered in complicated thread situations, a flag may not be effective in mitigating problems associated with delays and/or deadlocks. Thus there remains a need for a system and method to mitigate problems associated with automatic execution of class initialization code.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to a system and method for mitigating problems associated with automatic execution of initialization code. The invention facilitates detecting and/or resolving deadlocks that may occur due to the automatic execution of the initialization code. The deadlocks may occur due to, for example, class dependency loops. The possibility of deadlocks may make it impossible to guarantee that class initialization code executes before any use of the class, since a first class may depend on a second class that in turn depends back on the first class. When a class dependency loop exists, conventional systems may become deadlocked. But by employing the present invention, detecting and/or resolving deadlocks allows runtimes (e.g., the NET runtime) to offer a "begin guarantee" that a class initialization method will have started execution before a certain point in time, providing advantages over conventional systems. Such deadlock detection, prevention and/or resolution may be accomplished, for example, through the interaction of class initialization locks and a graph that models threads and "wait-for" relationships.

The invention further facilitates determining when a class initialization method is to be run, based on semantics associated with the class, where the semantics code a request for a guarantee that the initialization method be run at a certain time by the runtime system. For example, the invention facilitates requesting a guarantee that an initialization method will be run at times including, but not limited to, before any field of the class is accessed, before any method of a class is called and before a static field of the class is accessed. Different guarantees assist accommodating different types of initialization methods. By way of illustration and not limitation, some initialization methods are employed to initialize static fields associated with a class, and thus require only a loose guarantee (e.g., that the initialization method will be begun before the class static fields are visible). By way of further illustration, other initialization methods may be employed to perform processing that can produce undesired side effects, and thus a tighter guarantee may be required (e.g., that the initialization method be run at a precisely defined time). Controlling when the initialization method is run can lead to performance improvements, providing advantages over conventional systems. For example, the semantic type can be employed to decide between run times including, but not limited to, a callee's JIT (just in time compilation) time, during runtime processing, and during a caller's JIT.

A class created in accordance with the present invention can have a semantic type that can be examined by the runtime to determine when the initialization method should be run. For example, the class may have semantic types including, but not limited to, "exact" and "before field initialization". In addition a class may have interact with different domains that can be examined by the runtime to further clarify when the initialization method should be run. For example, the class may interact with domains whose domain uniqueness types including, but not limited to, "normal code" and "domain neutral code".

In accordance with an aspect of the present invention, a system for mitigating problems associated with automatic execution of initialization code is provided. The system includes an initialization method activator adapted to call the class initialization method at a pre-determined execution point and a deadlock analyzer adapted to determine whether running the class initialization method will produce a deadlock.

Another aspect of the present invention provides a system for mitigating problems associated with automatic execution of initialization code. The system includes an initialization method detector that determines whether a class has an initialization method, a semantic analyzer that determines a semantic type associated with the initialization method and a shared code analyzer that identifies attributes required by the runtime environment (e.g., the type of application domain with which the class will interact). The system further includes a deadlock analyzer adapted to determine whether calling the initialization method will create a deadlock and, if such a deadlock is encountered to resolve a deadlock. The system also includes an initialization method activator that calls the initialization method at a pre-determined execution point.

Another aspect of the present invention provides a computer readable medium containing computer executable components of a system for mitigating problems associated with automatic execution of initialization code. an initialization method activating component that calls a class initialization method at a pre-determined execution point and a deadlock analyzer adapted to determine whether calling the initialization method will create a deadlock and, if such a deadlock is encountered to resolve a deadlock.

Yet another aspect of the present invention provides a computer readable medium containing computer executable components of a system for mitigating problems associated with automatic execution of initialization code. a semantic analyzing component that determines a semantic type associated with the initialization method and a domain uniqueness analyzing component that determines a uniqueness type associated with an application domain with which the class will interact. The system further includes a deadlock analyzing component adapted to determine whether calling the initialization method will create a deadlock and, if such a deadlock is encountered to resolve the deadlock. The system also includes an initialization method activating component that calls the initialization method at a predetermined execution point.

Still yet another aspect of the present invention provides a method for mitigating problems associated with automatic execution of class initialization code. The method includes determining whether a class has an initializing method, determining when the initializing method should be run, inserting initialization check code into one or more components associated with a runtime, where the check code can determine whether a class is initialized, determining whether calling the initializing method will generate a deadlock and if calling the initializing method will generate a deadlock, resolving the deadlock and calling the class initializing method.

Yet another aspect of the present invention provides a computer readable medium containing computer executable instructions operable to perform a method for mitigating problems associated with automatic execution of class initialization code. The method includes determining whether a class has an initializing method, determining when the initializing method should be run, inserting initialization check code into one or more components associated with a runtime, determining whether calling the initializing method will generate a deadlock and if calling the initializing method will generate a deadlock, resolving the deadlock and calling the class initializing method.

Still yet another aspect of the present invention provides a method for mitigating problems associated with automatic execution of class initialization code. The method includes determining whether a class has an initializing method and determining when the initializing method should be run, where determining when the initializing method should be run comprises analyzing semantic information associated with the initializing method, where the semantic information comprises an identifier that identifies whether the initializing method desires "exact" or "before field initialization" behavior and analyzing domain uniqueness information associated with the initializing method, where the domain uniqueness information comprises an identifier that identifies whether the initializing method is operating in a "normal" or a "domain neutral" environment. The method further includes inserting initialization check code into one or more components associated with a runtime, determining whether calling the initializing method will generate a deadlock, resolving a deadlock and calling the class initializing method.

In one example of the aspect of the present invention described in the immediately preceding paragraph, determining whether calling the initializing method will generate a deadlock includes attempting to acquire an initialization lock associated with the class to be initialized. If the initialization lock cannot be acquired the method includes identifying a holding thread that is holding the initialization lock, locating a node associated with the holding thread, where the node is located in a wait for graph and analyzing the wait for graph to determine whether a deadlock exists. Analyzing the wait for graph to determine whether a deadlock exists includes traversing the wait for graph starting at the node associated with the holding thread and determining whether a cycle is detected in the wait for graph.

In another example aspect of the present invention described in the immediately preceding paragraph, resolving the deadlock includes acquiring a lock associated with the wait for graph, removing arcs and/or nodes that an acquiring thread added to the wait for graph, releasing the lock associated with the wait for graph and in the thread that detected that it could not initialize the class because a deadlock existed with another thread that was initializing the class, interacting with the class as though it was initialized.

Another aspect of the present invention provides a data packet adapted to be transmitted between two or more components. The data packet includes nodes associated with a wait for graph, where the nodes model one or more threads to be analyzed to determine whether class initialization code will generate a deadlock, and arcs associated with a wait for graph, where the arcs model wait for relationships between the nodes.

Yet another aspect of the present invention provides a data packet adapted to be transmitted between two or more components. The data packet includes a first field that holds information concerning the identity of a thread that is attempting to initialize a class, a second field that holds information concerning the identity of one or more threads that are waiting for a class to be initialized and a third field that holds information concerning the initialization status of a class.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
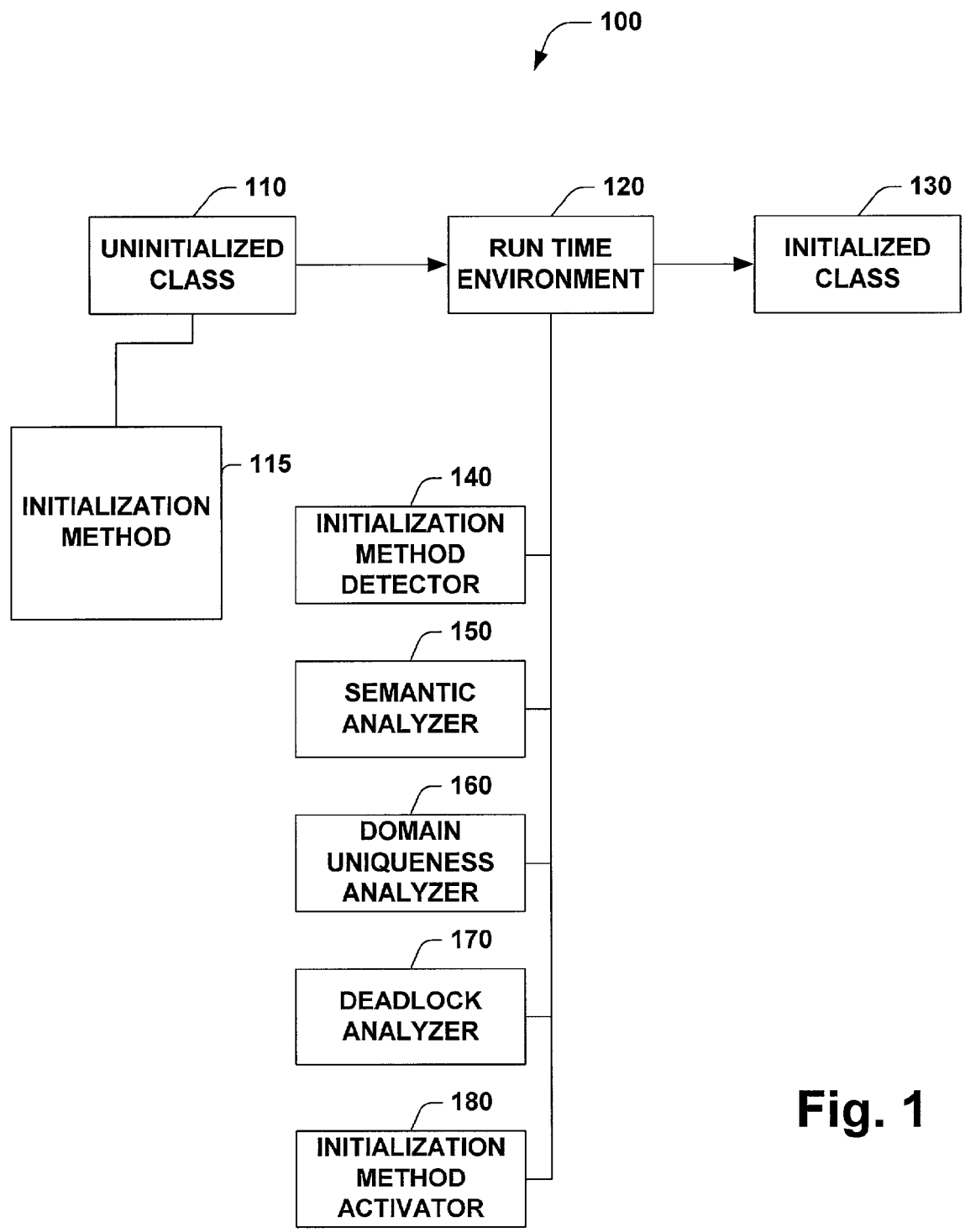
FIG. 1 is a schematic block diagram illustrating a system for determining when class initialization methods are executed and for determining the behavior of initialization methods in different contexts in the presence of potential deadlocks in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component.

It is to be appreciated that various aspects of the present invention may employ technologies associated with facilitating unconstrained optimization and/or minimization of error costs. Thus, non-linear training systems/methodologies (e.g., back propagation, Bayesian, fuzzy sets, non-linear regression, or other neural networking paradigms including mixture of experts, cerebella model arithmetic computer (CMACS), radial basis functions, directed search networks and function link networks may be employed.

FIG. 1 illustrates a system 100 that facilitates mitigating problems associated with automatic execution of initialization code. Such problems may include, but are not limited to, deadlocks, delays and performance degradation. The system 100 takes as an input an uninitialized class 110 and, in conjunction with a runtime environment 120 and an initialization method 115 produces an initialized class 130. The initialized class 130 may have a state that the initialization method 115 is responsible for establishing. For example, the state may concern information including, but not limited to, data communication channels, memory allocations, run time environment variables, application domain variables, security, and the like. The system 100 includes an initialization method detector 140 that is operable to determine whether the uninitialized class 110 has an initialization method 115. If the initialization method detector 140 determines that the uninitialized class 110 has an initialization method 115, then the initialization method detector 140 may, in connection with one or more of the semantic analyzer 150, the domain uniqueness analyzer 160 and the deadlock analyzer 170 determine an optimal time at which class initialization check code should be called to facilitate producing a desired initialization of the uninitialized class 110. For example, a first class may benefit by being initialized when an initial method call is made to the first class, while a second class may benefit by being initialized during a caller's JIT (just in time compile) time, a third class may benefit by being initialized during a callee's JIT time and a fourth class may benefit by being initialized when an initial field access is made on the fourth class. While four initialization times are described above, it is to be appreciated that a greater or lesser number of initialization times may be appropriate for running the initialization check code and thus that a greater or lesser number of initialization times may be managed by the present invention.

The system 100 includes a deadlock analyzer 170 that is operable to determine whether execution of the initialization method 115 will result in a deadlock. In one example of the present invention, the deadlock analyzer 170 employs initialization locks and analyzes a "wait for graph" to determine whether running class initialization code will generate a deadlock. The wait for graph is described in greater detail in association with FIG. 4. In another example of the present invention, the deadlock analyzer 170 analyzes one or more data structures that store information concerning running threads, waiting threads and the initialization status of classes to determine whether a deadlock will be generated. The deadlock analyzer 170 is further operable to perform one or more methods that can be employed to resolve a deadlock, providing advantages over conventional systems. In one example of the present invention, the deadlock analyzer 170 can traverse a wait for graph and/or add and/or remove arcs and/or nodes from the wait for graph to facilitate resolving a deadlock. In another example of the present invention, the deadlock analyzer 170 can update one or more data structures that store information concerning running threads, waiting threads and the initialization status of classes to facilitate resolving a deadlock.

The system 100 may further include an initialization method activator 180 that can determine whether a class is initialized. If the class is not initialized, the initialization method activator 180 can call the initialization method 115 at a pre-determined execution point, based, at least in part, on the semantic type and/or the domain uniqueness of the initialization method 115. The predetermined execution points include, but are not limited to, at a callee's JIT (just in time compilation) time, during runtime processing and at a caller's JIT.

The system 100 may include a semantic analyzer 150. The semantic analyzer 150 can determine the semantic type of the uninitialized class 110 and/or the initialization method 115. For example, the uninitialized class 110 and/or the initialization method 115 may have semantic types including, but not limited to, "exact" and "before field initialization". Such types may be relevant to determining the optimal time to perform initialization check code. By way of illustration and not limitation, exact code may require that the runtime environment 120 guarantee that the class initialization method 115 be run at a precisely defined execution point, or, alternatively, that the class initialization method 115 at least have begun operation at a precisely defined time (e.g., before initial method call to class). By way of further illustration, before field initialization code may require that the runtime environment 120 guarantee that the class initialization method 115 will be run at some point in time before the first access to a field of the class is made. Before field initialization code thus requires a less strict guarantee from the runtime environment 120 than does exact code. Analyzing the semantics associated with the uninitialized class 110 and/or the initialization method 115 facilitates more precisely locating the point in time at which the initialization method activator 180 should call the initialization method 115, providing advantages over conventional systems that do not provide similarly precise control.

The system 100 may further include a domain uniqueness analyzer 160. Domain uniqueness is related to properties of the environment in which the class will be asked to run. Thus, the domain uniqueness analyzer 160 can determine domain uniqueness properties of the environment, where such uniqueness types may also be relevant to determining the optimal time to perform initialization check code. For example, some classes may benefit from having their initialization code executed exactly once while other data types may benefit from having their initialization code executed once for each application domain in which the data type is employed. Thus, the domain uniqueness analyzer 160 may identify uniqueness domains including, but not limited to, "normal" and "domain neutral" uniqueness domains. Analyzing the uniqueness of the domains with which the class will be asked to run facilitates more precisely locating the execution point at which the initialization method activator 180 should call the initialization method 115, providing advantages over conventional systems that do not provide similarly precise control.

Figure 2:
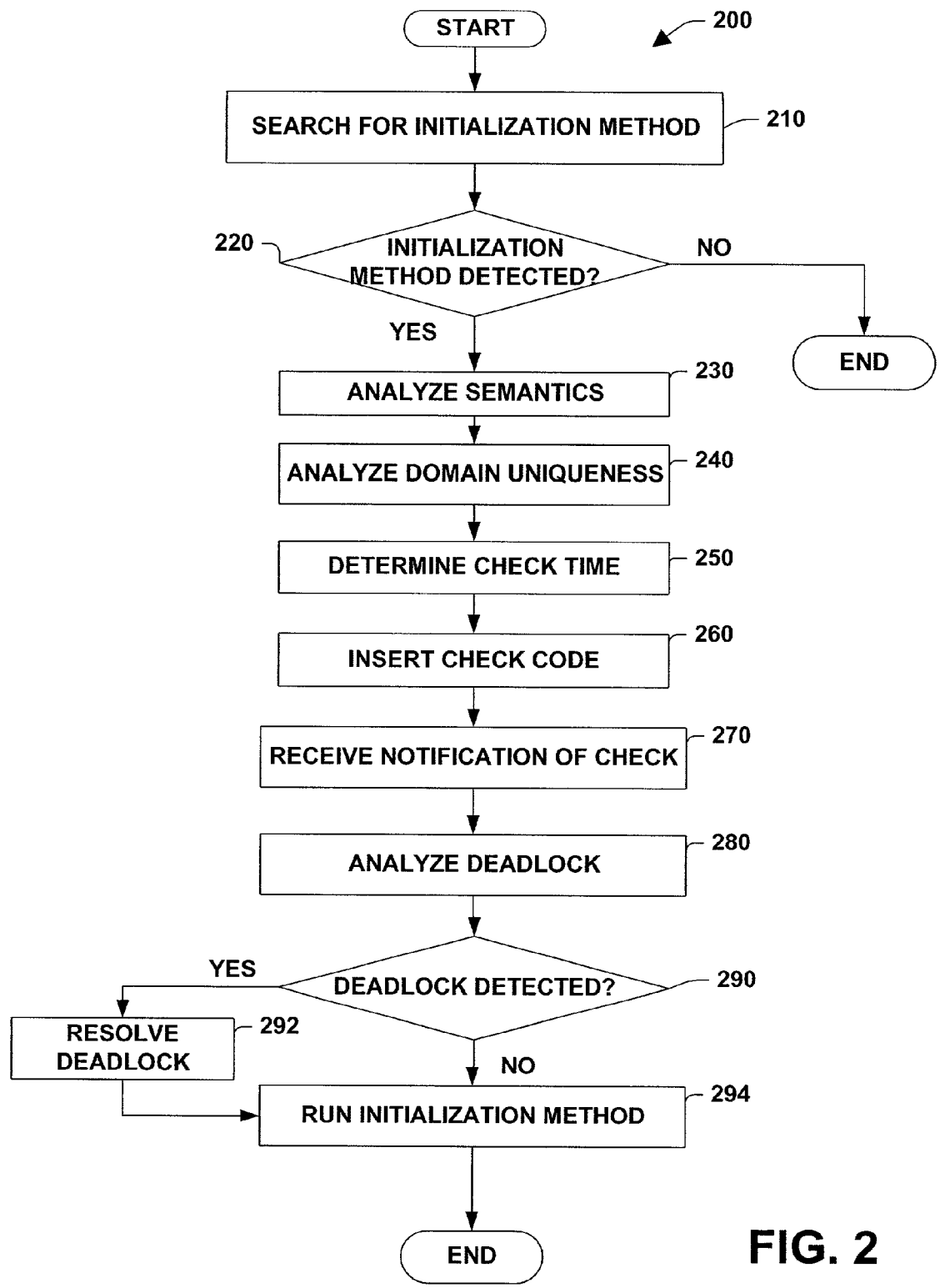
FIG. 2 is a flowchart illustrating a method for determining when class initialization methods are executed and for determining the behavior of initialization methods in different contexts in the presence of potential deadlocks in accordance with an aspect of the present invention.
Figure 5:
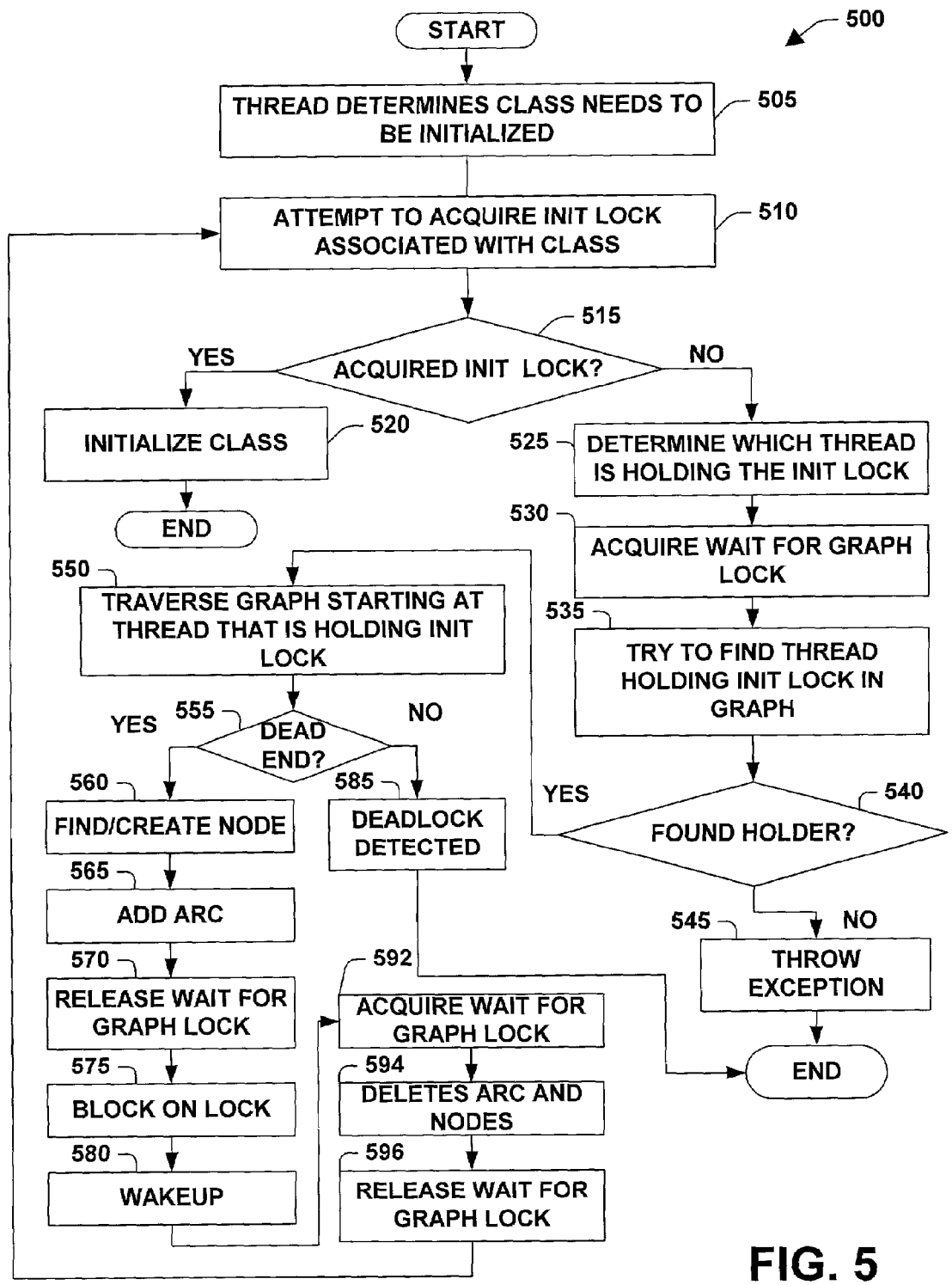
FIG. 5 is a flowchart illustrating a method for detecting, preventing and/or resolving deadlocks in accordance with an aspect of the present invention.
Figure 12:
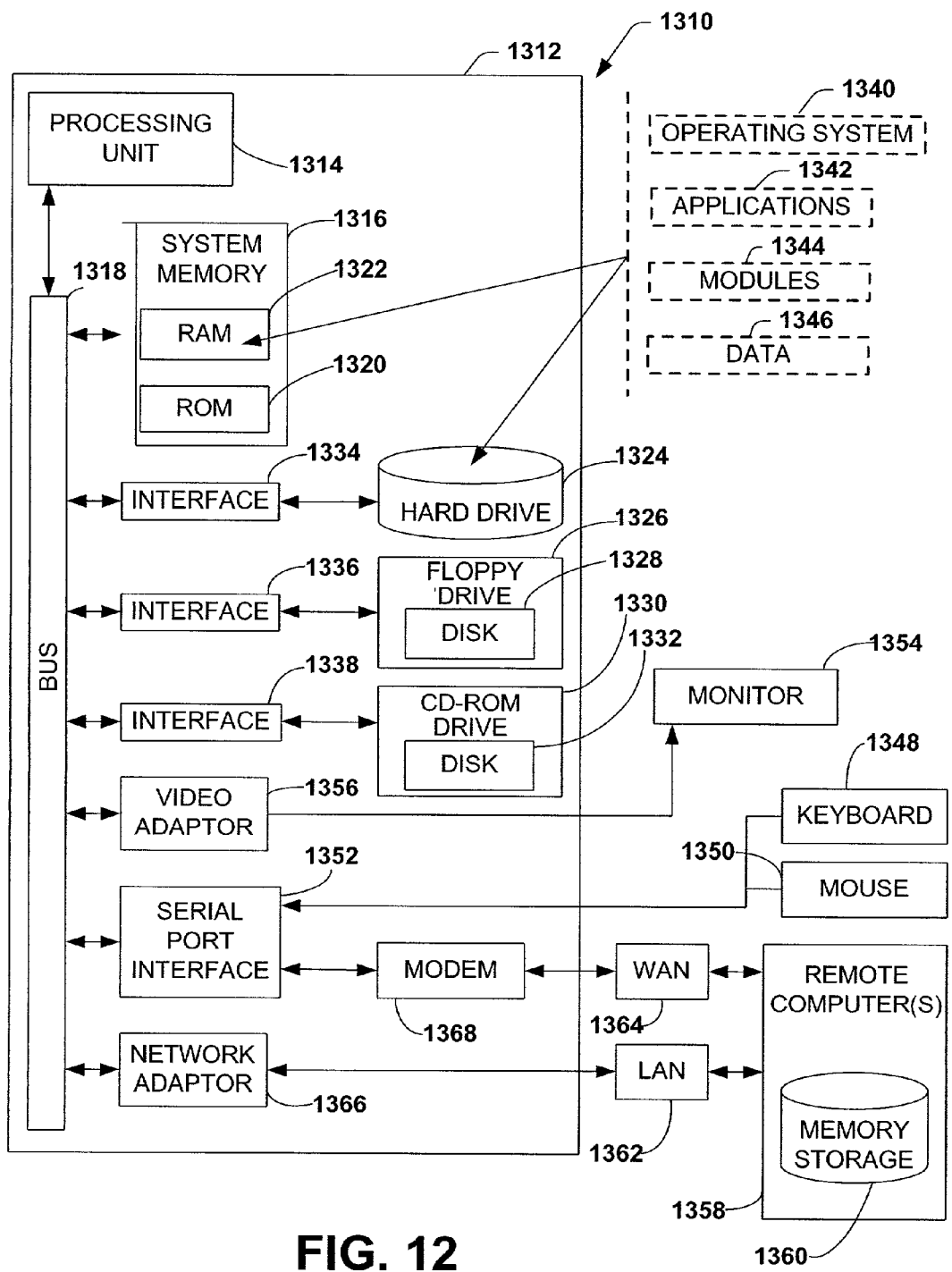
FIG. 12 is a schematic block diagram of an exemplary operating environment for a system configured in accordance with the present invention.

In view of the exemplary systems shown and described above, methodologies that may be implemented in accordance with the present invention will be better appreciated with reference to the flow charts of FIGS. 2, 5 and 12. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

FIG. 2 illustrates a method 200 for determining when a class initialization method should be executed given the potential of deadlocks and various contexts (e.g., semantics, uniqueness). At 210, a search is made for a class initialization method. At 220, a determination is made concerning whether the search of 210 revealed a class initialization method. If no initialization method was found at 210, then at 220 the determination is NO, and the method 200 concludes. If an initialization method was found at 210, then the determination at 220 is YES, and processing proceeds to 230.

At 230, semantics associated with the initialization method and/or the class with which the initialization method is associated may be analyzed. Similarly, at 240, the uniqueness of the domain with which the initialization method and/or the class will interact is analyzed. Analyzing the semantics of the initialization method and/or the class and analyzing the uniqueness of the initialization method and/or the class can generate information that can be employed at 250, where the time at which class initialization check code is to be run is determined. Identifying an optimal execution point to run class initialization check code facilitates mitigating problems like performance degradation and delays, thus providing advantages over conventional systems. One design obstacle that is overcome by the present invention is identifying the optimal execution point at which to run the class initialization check code to maximize the opportunity to facilitate mitigating such problems. Thus, at 250, check times including, but not limited to, a caller's JIT time, a callee's JIT time, before an initial static field access, before an initial field access and before an initial method call may be considered for the location of the class initialization check code.

It is to be appreciated that method 200 may, in one example of the present invention, be performed with neither block 230 nor block 240. If, however, blocks 230 and 240 are performed, then the time that is determined at block 250 may be chosen according to Table I. Table I includes entries for normal code, (where the initialization code needs to initialize one set of static fields) and domain neutral code, (where the initialization code needs to initialize more than one set of static fields). Normal code and domain neutral code are discussed further in association with FIG. 6. Table I further subdivides candidate check times into "exact" code and "before field init" code columns, which concern the guarantee that the runtime provides to a user of the present invention.

TABLE I

| Normal code | Exact | Before Field Init |
|---|---|---|
| Static method call | JIT (callee) | none |
| Static field access | runtime | JIT (accessor) |
| Inlined static method call | runtime | none |
| Instance method access | [constructor] | [constructor] |
| Instance field access | [constructor] | [constructor] |
| Value type method call | JIT (callee) | none |
| Value type field access | runtime | none |
| Domain neutral code | Normal | Before Field Init |
| Static method call | runtime | none |
| Static field access | runtime | runtime check |

TABLE I-continued

| | | |
|---|---|---|
| Inlined static method call | runtime | none |
| Instance method call | [constructor] | [constructor] |
| Instance field access | [constructor] | [constructor] |
| Value type method call | runtime | none |
| Value type field access | runtime | none |

Key:

| | |
|---|---|
| Runtime | a runtime check is inserted in the code at this point. |
| JIT | do a JIT compile time check rather than a runtime check. |
| None | No check is needed |
| [constructor] | do not do check, assume initialization method has already been run and has triggered the type initialization code |

At 260, class initialization check code may be associated with one or more components associated with the class and/or the runtime. By way of illustration, code generated by a runtime may be updated with one or more instructions that will invoke class initialization check code.

At 270, the method 200 receives notification that class initialization check code has been invoked. Thus, at 280, the method 200 performs analyses to determine whether running the class initialization method associated with the class will generate a deadlock. In one example of the present invention, which will be examined in greater detail in connection with FIG. 5, determining whether the class initialization method will generate a deadlock includes attempting to acquire an initialization lock associated with the class to be initialized. If the initialization lock cannot be acquired, then the method 200 identifies a holding thread that is holding the initialization lock. Once the holding thread has been identified, the method 200 locates a node associated with the holding thread, where the node is located in a wait for graph. Once the node associated with the holding thread has been located in the wait for graph, the wait for graph is analyzed to determine whether a deadlock exists. In one example of the present invention, analyzing the wait for graph to determine whether a deadlock exists involves traversing the wait for graph starting at the node associated with the holding thread and determining whether a cycle is detected in the wait for graph. If a cycle is encountered, then a deadlock has been detected. If no cycle is detected (e.g., a dead-end is reached), then no deadlock has been detected.

At 290, a determination is made concerning whether a deadlock was detected at 280. If the determination at 290 is YES, then at 292, the deadlock is resolved. In one example of the present invention, which will be examined in greater detail in connection with FIG. 5, resolving the deadlock includes analyzing and/or manipulating the wait for graph. For example, nodes and/or arcs may be added and/or removed from the wait for graph. Resolving the deadlock may require the present invention providing a limited guarantee to classes, where the guarantee is limited to promising that a class initialization method will have at least begun by the time desired by the class. With such a limited guarantee, partially initialized state of the class may be exposed. However, exposing such partially initialized state can provide advantages over conventional systems that would have experienced a deadlock and not initialized the class at all. Furthermore, complications associated with exposing partially initialized state can be mitigated by providing a warning that the state is only partially initialized, where the warning can be employed to facilitate a thread waiting for a signal that the class is completely initialized.

At 294, if the deadlock detection determined that the class initialization method had not already been started, then the class initialization method can be run. Simply insuring that the class initialization method can be run provides advantages over conventional systems that can offer no such similar guarantee, since deadlock conditions may lead to class initialization methods not being run.

Figure 3:
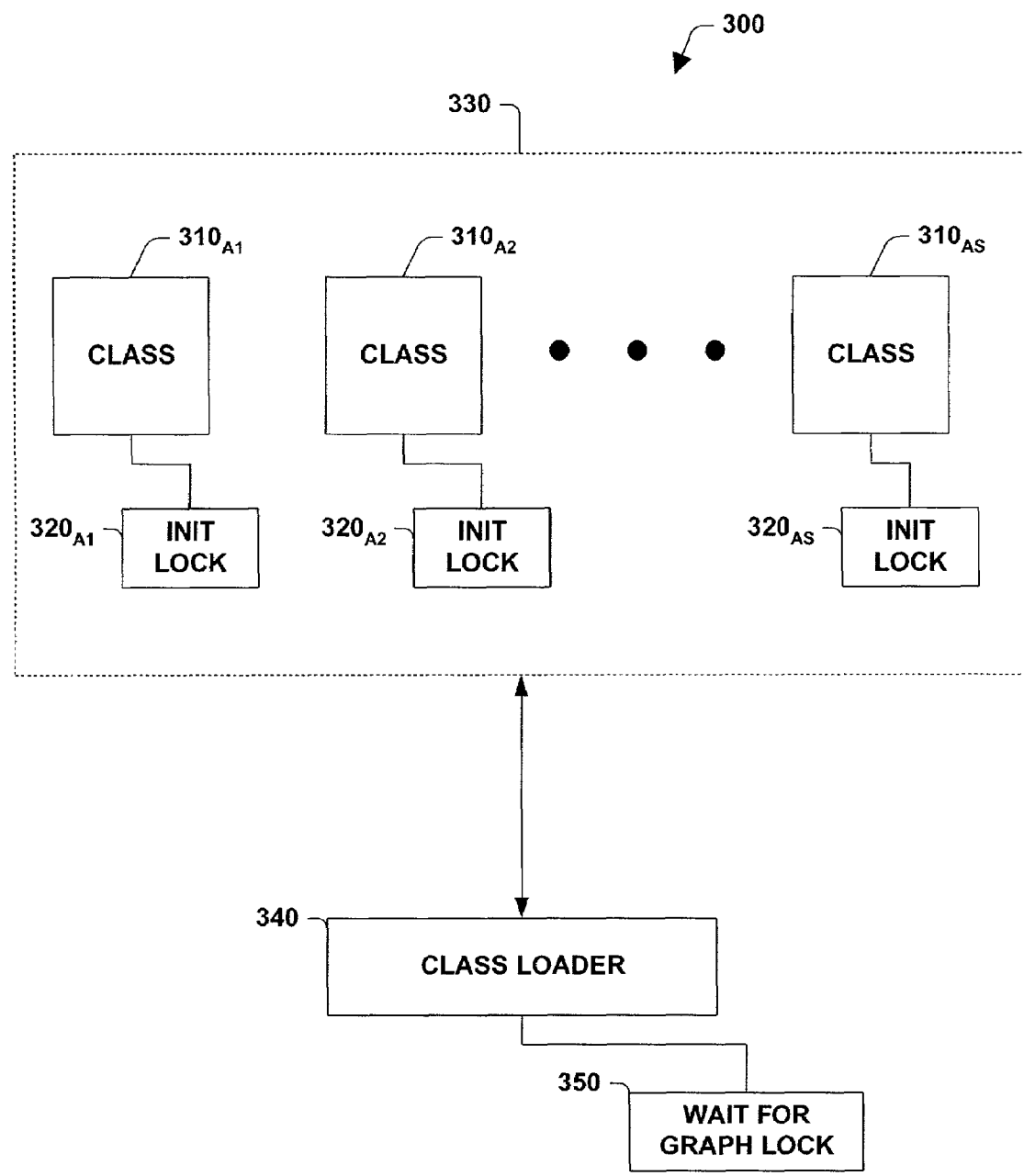
FIG. 3 is a schematic block diagram illustrating locks associated with classes and a wait for graph, where the locks can be employed to facilitate detecting, preventing and/or resolving deadlocks in accordance with an aspect of the present invention.

FIG. 3 illustrates a framework 300 that employs locks to facilitate detecting, preventing and/or resolving deadlocks. The framework 300 includes a class loader 340 that is responsible for loading classes (e.g., classes $310_{A1}$ through $310_{AS}$, S being an integer) associated with a runtime environment 330. Processing performed by the class loader 340 includes identifying and/or invoking class initializing methods, and determining whether a thread is already performing the class initializing method associated with a class. Thus, locks (e.g., initialization lock $320_{A1}$ through $320_{AS}$, S being an integer) are associated with the classes to facilitate determining whether a thread is already performing the class initializing method associated with a class. If the class loader 340 detects that a class has a class initialization method and also detects that a thread has acquired the initialization lock associated with the class, then the class loader 340 has acquired information that facilitates detecting, preventing and/or resolving a deadlock. For example, once the class loader 340 detects that a class initialization lock has been acquired, then the class loader 340 can acquire a wait for graph lock 350 and examine a wait for graph (see, e.g., FIG. 4) to identify potential deadlocks and thus determine whether to continue an attempt to invoke a class initiation method. If no deadlocks are discovered, then the class loader 340 can simply block, and wait for the initialization lock to be released. If, however, a deadlock is discovered, then the class loader 340 can perform more sophisticated processing in an attempt to prevent and/or resolve a deadlock. One example of such sophisticated processing is provided in association with FIG. 5.

Figure 4:
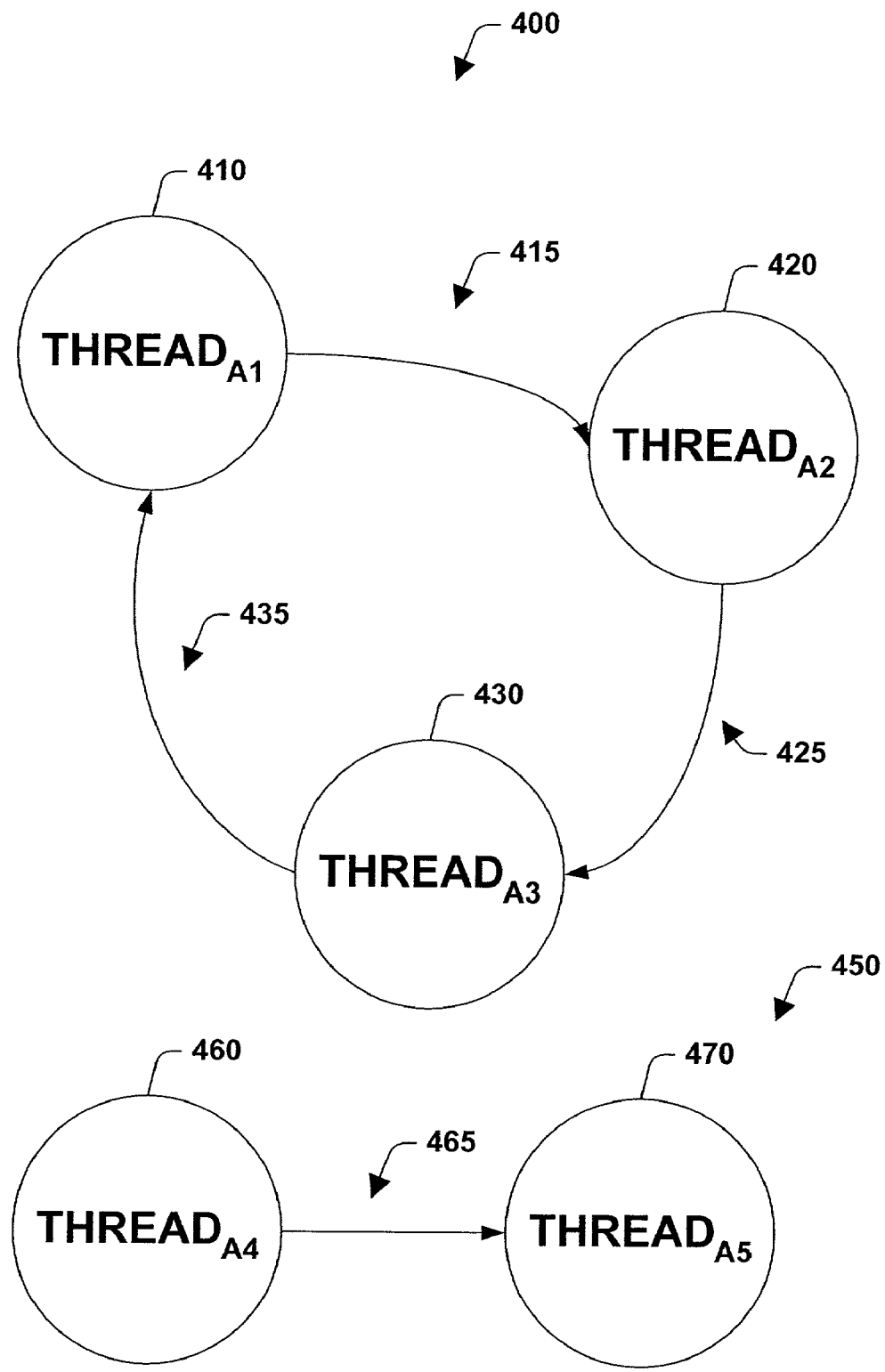
FIG. 4 is a graph illustrating threads (nodes) and wait for relationships (arcs) that can be employed to facilitate detecting, preventing and/or resolving deadlocks in accordance with an aspect of the present invention.

FIG. 4 illustrates a graph 400 that can be employed to facilitate detecting, preventing and/or resolving deadlocks associated with running class initialization code. In one example of the present invention, the graph 400 is referred to as a "wait for graph", which indicates that the graph 400 is modeling which threads, if any, are waiting for other threads to perform work. In the graph 400, threads are represented by nodes and wait for relationships are represented by arcs. Thus, in graph 400, three threads are represented (e.g., $THREAD_{A1}$ 410, $THREAD_{A2}$ 420, $THREAD_{A3}$ 430). Similarly, three wait for relationships are represented (e.g., arcs 415, 425 and 435). Arc 415 indicates that $THREAD_{A1}$ 410 is waiting for $THREAD_{A2}$ 420 to perform class initialization processing. Similarly, arc 425 indicates that $THREAD_{A2}$ 420 is waiting for $THREAD_{A3}$ 430 to perform class initialization processing and arc 435 indicates that $THREAD_{A3}$ 430 is waiting for $THREAD_{A1}$ 410 to perform class initialization processing. Thus, the graph 400 illustrates a situation where three threads, $THREAD_{A1}$ 410, $THREAD_{A2}$ 420 and $THREAD_{A3}$ 430 are deadlocked. FIG. 4 also illustrates a second graph 450, where there is a dead-end. In graph 450, $THREAD_{A4}$ 460 is waiting for $THREAD_{A5}$ 470, as represented by arc 465, but $THREAD_{A5}$ 470 is not waiting for any thread, which indicates that $THREAD_{A4}$ 460 and $THREAD_{A5}$ 470 are not deadlocked. Thus, the locks illustrated in connection with FIG. 3 and the wait for relationships illustrated in connection with FIG. 4 can be employed, for example, by the method described in connection with FIG. 5. Although five threads and four wait for relationships are modeled in FIG. 4, it is to be appreciated that the present invention facilitates detecting, preventing and/or resolving deadlocks with a greater and/or lesser number of threads and/or wait for relationships.

FIG. 5 illustrates a method 500 for detecting, preventing and/or resolving deadlocks, where the method 500 relies on locks like those described in association with FIG. 3 and a wait for graph like that described in association with FIG. 4. At 505, the method 500 determines that a class needs to be initialized. By way of illustration and not limitation, the method 500 may receive a signal from a class loader that a class should be loaded and may determine that the class is not initialized. By way of further illustration, the method 500 may determine that a class needs to be loaded by means including, but not limited to, receiving an interrupt, polling a variable and receiving a message. At 510, the method 500 attempts to acquire an initialization lock associated with the class to be initialized. At 515, a determination is made concerning whether the initialization lock was acquired. If the determination at 515 is YES, then at 520 the class can be initialized and class initialization code can be started. It is to be appreciated that the started class initialization code may block at some point during its processing.

If the determination at 515 is NO, then at 525 the method 500 determines which thread is holding the initialization lock. Once the method 500 has determined which thread is holding the initialization lock, then at 530 the method 500 can acquire the wait for graph lock. The wait for graph is protected by a lock to prevent side effects (e.g., race conditions wherein multiple threads are updating the graph simultaneously). Once the method 500 acquires the wait for graph lock, then at 535 the method 500 can attempt to find a node associated with the thread that is holding the initialization lock that the method 500 attempted to acquire at 510.

At 540, a determination is made concerning whether the method 500 was able to find a node associated with the thread that was holding the initialization lock. If the determination at 540 is NO, then the wait for graph lock can be released and an exception may be thrown at 545, indicating that inconsistent data has been encountered. The exception may arise, for example, due to a bug in the implementation or corruption of memory. While an exception is described at 545, it is to be appreciated that other error handling techniques (e.g., interrupt, setting error flag) may be employed in accordance with the present invention. If the determination at 540 is YES, then at 550, the method 500 may traverse the wait for graph starting at the node associated with the thread identified at 525.

At 555 a determination is made concerning whether the traversal of 550 reached a dead end. If the determination at 555 is YES, that a dead end was reached, then no deadlock has been detected. Thus, the method 500 will update the wait for graph to indicate that the thread associated with the method 500 is waiting for the thread identified at 525 to complete its processing and release the initialization lock that the method 500 attempted to acquire at 510. Updating the graph includes, at 560, finding and/or creating a node associated with the thread associated with the method 500 and finding and/or creating a node associated with the thread that is holding the initialization lock. At 565, an arc between the two nodes is added, indicating that the thread associated with the method 500 is waiting for the thread associated with holding the initialization lock to finish its processing and/or release the initialization lock. At 570, the method 500 releases the wait for graph lock that it acquired at 530 and thus, since the method is aware that another thread holds an initialization lock that the method 500 desires, the method 500 blocks on a lock at 575 (so that when the class initialization is complete, the thread waiting on the lock can be awakened rather than waiting to time out from sleep and retrying). At 580, the method 500 wakes up and at 592, the method 500 acquires the wait for graph lock. Then, at 594, arcs and/or nodes that were previously added by the thread associated with the method 500 are deleted from the wait for graph, and at 596 the thread associated with the method 500 can release the wait for graph lock. The processing associated with blocks 592 through 596 removes wait for relationships from the wait for graph because the method 500 is not going to wait for the initialization lock to be released since a deadlock was detected. Rather than wait for the lock, which due to the deadlock might never be released, the thread associated with the method 500 will return and, in one example of the present invention, the thread may interact with the class as though it was initialized. Interacting with the class in this manner may result in a partially initialized state of the class being exposed. Thus, warnings may be issued that the state is only partially initialized. However, exposing a partially initialized state provides advantages over conventional systems that would have deadlocked and not initialized the class at all.

If the determination at 555 is NO, that a dead end was not reached, then a cycle was traversed, and thus a deadlock was detected. Therefore, at 585, processing associated with the detected deadlock may be undertaken. For example, processing including, but not limited to, generating an interrupt, sending a signal, sending a message and setting a variable value may be performed.

Figure 6:
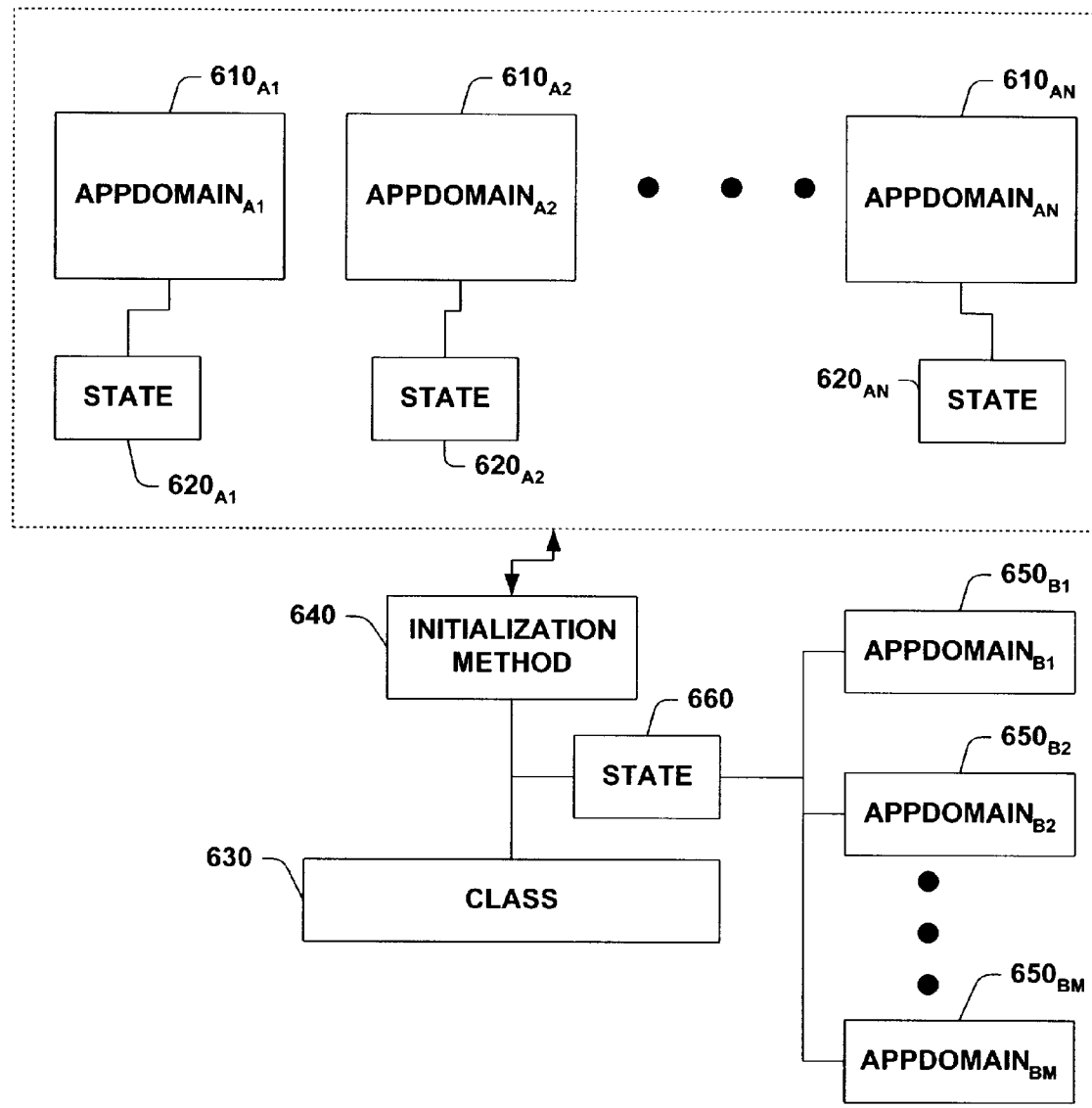
FIG. 6 is a schematic block diagram illustrating domain uniqueness environments in accordance with an aspect of the present invention.

FIG. 6 illustrates domain uniqueness environments with which a class 630 to be initialized and/or a class initialization method 640 may interact. The environments may be relevant to determining when and/or if a class initialization method should be run. By way of illustration, in a normal code environment, initialization code is employed to initialize one set of static fields, and that set of static fields may be shared between one or more application domains. By way of further illustration, in a domain neutral code environment, initialization code may need to be run to initialize more than one set of static fields, since individual application domains may each desire their own state, rather than sharing a state between application domains.

Concerning a normal code environment, a number of application domains (e.g., $APPDOMAIN_{B1}$ $650_{B1}$ through $APPDOMAIN_{BM}$ $650_{BM}$, M being an integer), may each share a state 660 associated with the class 630. Thus, in determining whether to run a class initialization method 640, the present invention may interact with single locks associated with the state 660, the class 630 and/or the initialization method 640. But in a domain neutral code environment, a number of application domains (e.g., $APPDOMAIN_{A1}$ $610_{A1}$ through $APPDOMAIN_{AN}$ $610_{AN}$, N being an integer) may each have their own state (e.g., $STATE$ $620_{A1}$ through $STATE$ $620_{AN}$, N being an integer) associated with the class 630 and thus the present invention may interact with a number of locks associated with the application domains $610_{A1}$ through $610_{AN}$ and the states $620_{A1}$ through $620_{AN}$.

Turning now to FIGS. 7 through 11, timing diagrams illustrate class access and associated initialization method processing. In some cases, such initialization method processing can lead to a deadlock, and thus the present invention is employed to detect, prevent and/or resolve such deadlocks.

Figure 7:
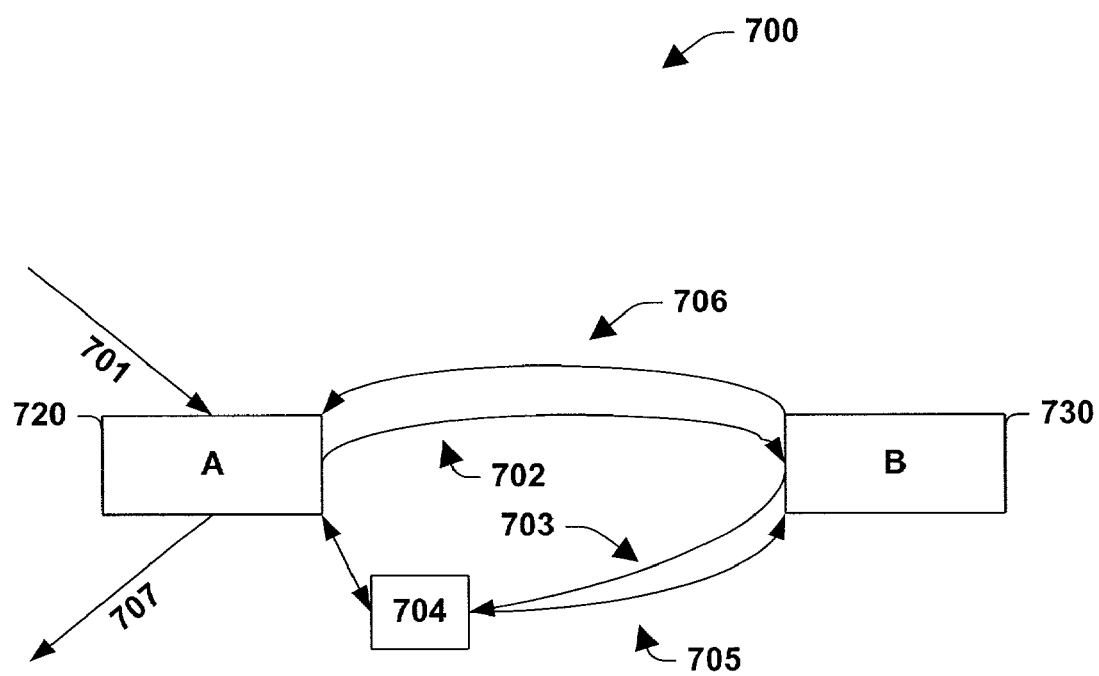
FIG. 7 is a timing diagram illustrating a single thread with no deadlock being processed in accordance with an aspect of the present invention.

FIG. 7 illustrates a call invocation sequence 700 in which a single thread accesses class initiating code with no resulting deadlock. At 701, class A 720 is accessed, and thus class initialization code associated with class A 720 is invoked.

Class A 720 depends on class B 730, and thus, at 702 the class initialization code associated with class A 720 accesses class B 730. Class B 730 in turn depends on class A 720, and thus, at 703 class B 730 attempts to access class A 720, and invoke class initialization code associated with class A 720. But, at 704, the present invention determines that the same thread that is currently attempting to invoke the class initialization code associated with class A 720 is already running the class initialization code associated with class A 720, and thus, at 705, the invocation returns, without actually invoking the class initialization code associated with class A 720. Thus, at 706, the invocation at 702 can return, the class initialization method associated with class A 720 can complete and at 707 the access of 701 can return.

In one example of the present invention, one or more data structures may store information associated with the call invocation sequence. For example, Table II illustrates the state of variables (e.g., RT (running thread), WT (waiting thread), INIT? (initialized?)) associated with class A 720 and class B 730. In the table, a zero represents a null value, a non zero integer represents a thread identifier, a T represents a true state and an F represents a false state. Thus, the states for the variables in Table II may vary as illustrated in accordance with the processing described in the preceding paragraph. It is to be appreciated that the six variables and the states through which they pass are merely illustrative and that other variables and/or data structures may be employed in accordance with the present invention.

TABLE II

|  | A | | | B | | |
| --- | --- | --- | --- | --- | --- | --- |
|  | RT | WT | INIT? | RT | WT | INIT? |
| 701 | 1 | 0 | F | 0 | 0 | 0 |
| 702 | 1 | 0 | F | 1 | 0 | F |
| 703 | 1 | 0 | F | 1 | 0 | F |
| 704 | 1 | 0 | F | 1 | 0 | F |
| 705 | 1 | 0 | F | 0 | 0 | T |
| 706 | 1 | 0 | F | 0 | 0 | T |
| 707 | 0 | 0 | T | 0 | 0 | T |

Figure 8:
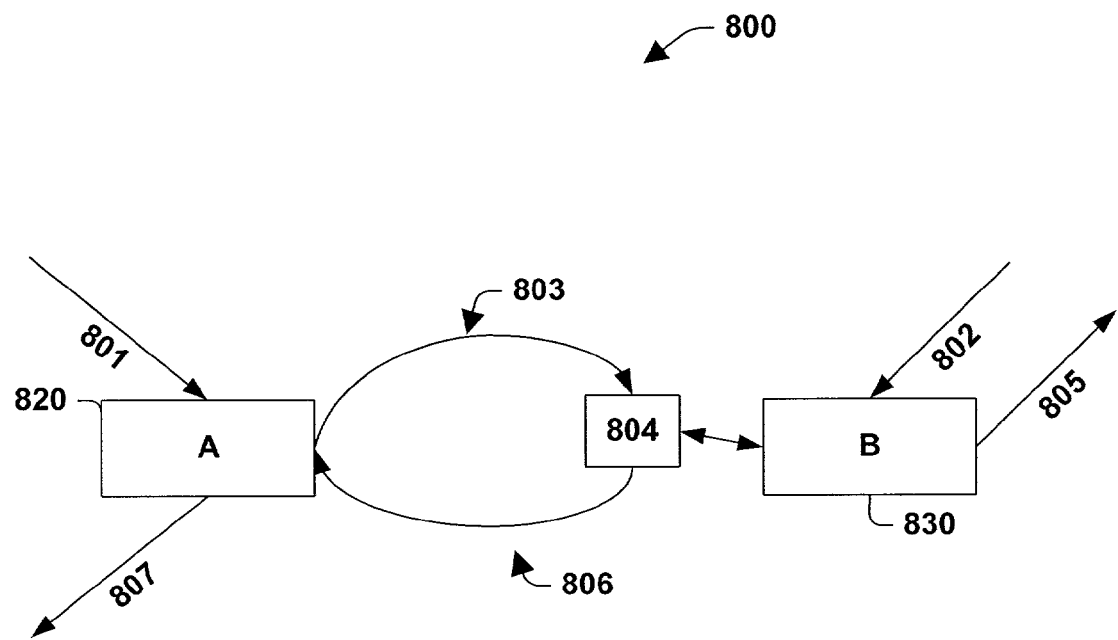
FIG. 8 is a timing diagram illustrating two threads with no deadlock being processed in accordance with an aspect of the present invention.

Having seen a single thread with no deadlock in FIG. 7, FIG. 8 illustrates a call invocation sequence 800 associated with two threads that result in no deadlock. In FIG. 8, class A 820 depends on class B 830, but class B 830 does not depend on class A 820, and thus there is no class dependency loop. At 801, class A 820 is accessed. Thus, the class initialization method for class A 820 begins running. At 802, class B 830 is accessed, which causes the class initialization method for class B 830 to begin running. In this example, class B 830 does not depend on class A 820 so starting the class initialization method for class B 830 does not cause class A 820 to be accessed. Class A 820 depends on Class B 830 and thus, at 803, class A 820 attempts to access class B 830 and attempts to start class B 830 class initialization code. But at 802, Class B 830 was already accessed, and the class initialization code associated with class B 830 is already running. Thus, at 804, the access from class A 820 blocks, and waits for the thread that is running the class initialization code associated with class B 830 to complete. The present invention, by accessing locks, a wait for graph, and/or one or more variables and/or data structures facilitates detecting that invocation 803 can block at 804 without causing a deadlock. Thus, at 805, the class invocation method associated with class B 830 completes and returns, which allows the block of 804 to be lifted, and at 806, the call 803 from class A 820 to return, which in turn allows the class initialization method associated with class A 820 to complete and at 807 to return. By blocking at 804, after detecting that such a block would not cause a deadlock, class A 820 is able to interact with a completely initialized class B 830, providing advantages over conventional systems that do not provide such deadlock detection and selective blocking behavior.

Figure 9:
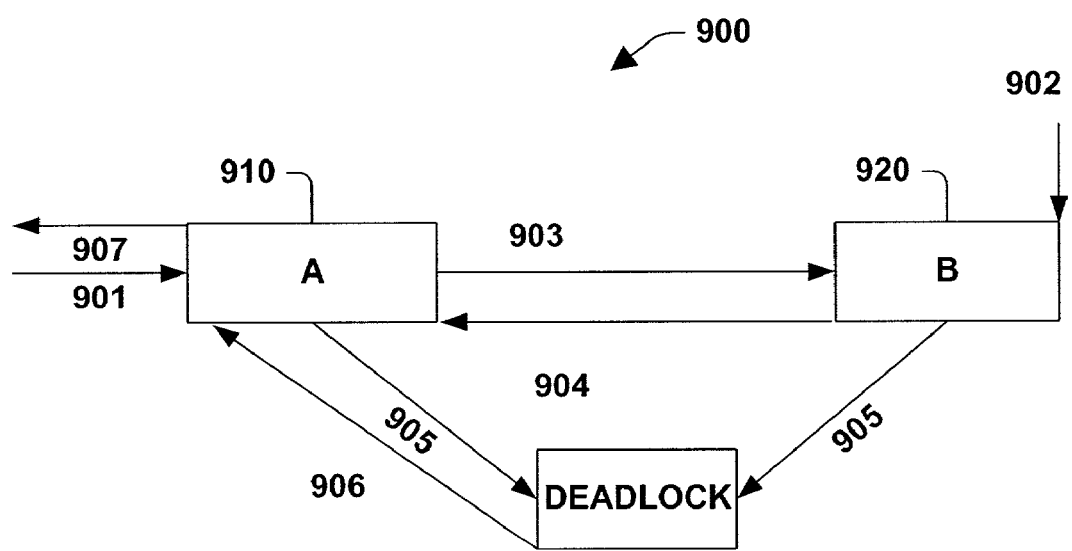
FIG. 9 is a timing diagram illustrating two threads with a deadlock based on a class dependency loop being processed in accordance with an aspect of the present invention.

Having seen a situation where no deadlock occurred, FIG. 9 illustrates a call invocation sequence 900 where two threads may potentially generate a deadlock based on a class dependency loop. Thus, the present invention provides means to detect, prevent and/or resolve such a class dependency loop deadlock, providing advantages over conventional systems.

A class dependency loop may arise from code similar to the following pair of class initialization method definitions:

```
Public class A
{
    public A a;
    public B b;
    .cctor A              // class initialization method for class A
    {
        ...
        b = null;         // assign a null value to field b
        a = B.a;          // assign a value from a class B object to field a
        ...
    }
}
public class B
{
    public A a;
    public B b;
    .cctor B              // class initialization method for class B
    {
        ...
        a = null;         // assign a null value to field a
        b = A.b;          // assign a value from a class A object to field b
        ...
    }
}
```

The class dependency loop identified in the high level code provided above may similarly appear in more low level code (e.g., IL code).

```
Class public A extends [corlib] System.Object
{
    field static public class A a;
    field static public class B b;
    method public static rtspecialname specialname void .cctor( )
    {
        ldnull;
        stsfld    class B A::b;
        ldsfld    class A B::a;
        stsfld    class A A::a;
        ret;
    }
}
Class public B extends [corlib] System.Object
{
    field static public class A a;
    field static public class B b;
    method public static rtspecialname specialname void .cctor( )
    {
        ldnull;
        stsfld    class A B::a;
        ldsfld    class B A::b;
        stsfld    class B B::a;
        ret;
    }
}
```

In the pairs of code provided above, class A depends on class B, and class B depends on class A. Thus, the following invocation sequence 900 is possible:

At 901, class A 910 is accessed by a first thread, thus, the class initialization code associated with class A 910 begins execution. At 902, class B 920 is accessed by a second thread, thus the class initialization code associated with class B 920 begins execution. At 903, the class initialization method associated with class A 910 attempts an access to class B 920, but the access at 902 may have already acquired a class initialization lock associated with class B 920. At 904, the class initialization method associated with class B 920 attempts an access to class A 910, but the access at 901 may have already acquired a class initialization lock associated with class A 910. Thus, at 905 a deadlock is detected. The thread associated with access 901 to class A 910 is blocked waiting access to the constructor for class B 920, but the thread associated with the access 902 to class B 920 is blocked waiting for access to the constructor for class A 910. Conventional systems may become deadlocked at this point. But the present invention facilitates detecting the deadlock at 905 and providing a resolution mechanism. By way of illustration and not limitation, the present invention may provide a "begin guarantee" that class initialization code will at least begin before a certain execution point is crossed. Thus, once the deadlock at 905 is detected, the present invention may determine that the class initialization code associated with class B 920 should be allowed to complete, which will resolve the deadlock.

Thus, at 906, the call to the class initialization code associated with class A 910 returns, without the class initialization code associated with class A 910 having completely initialized the class A. Thus, in association with the guarantee that class initialization code will at least begin before a certain execution point is crossed comes the associated notice that partially initialized state may be exposed when a "begin guarantee" is employed. Once the return of 906 is completed, then completion at 907 is possible, and the deadlock is resolved. Resolution of the deadlock will be examined in greater detail in association with the next figure.

Figure 10:
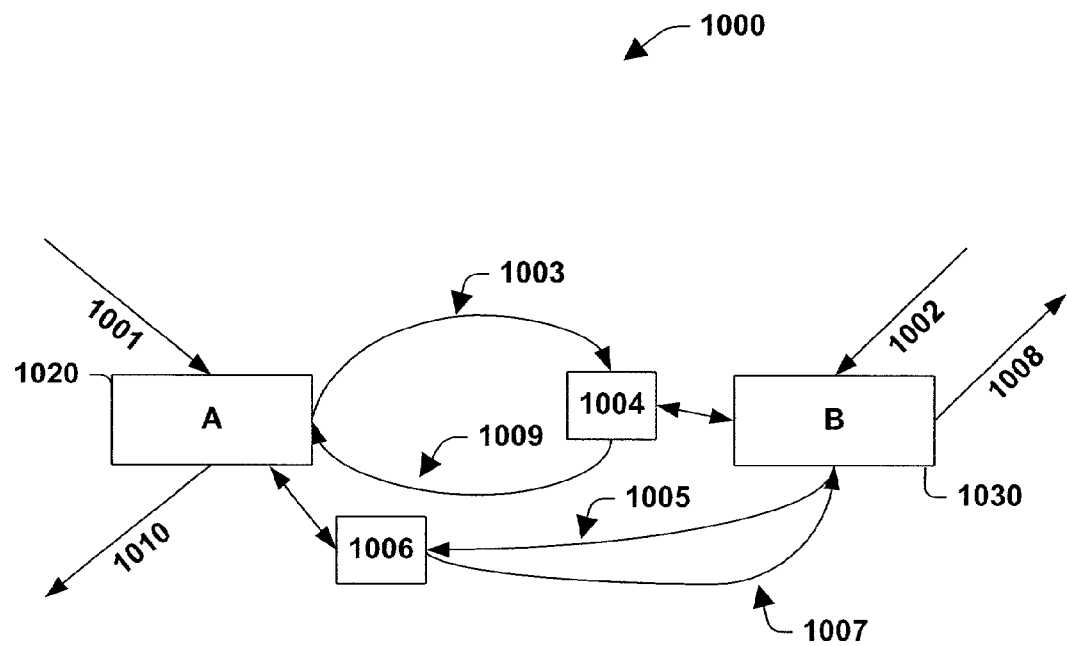
FIG. 10 is a timing diagram illustrating deadlock resolution between two threads in accordance with an aspect of the present invention.

FIG. 10 illustrates a call invocation sequence 1000 that demonstrates deadlock resolution between two threads in accordance with an aspect of the present invention. At 1001, class A 1020 is accessed by a first thread and thus class initialization code associated with class A 1020 begins execution. At 1002, class B 1030 is accessed by a second thread and thus class initialization code associated with class B 1030 begins execution. Since class A 1020 depends on class B (see e.g., class dependency code samples associated with FIG. 9), at 1003, the thread that accessed class A 1020 attempts to begin the class initialization code associated with class B 1030. But at 1040, the present invention facilitates determining that the class initialization code associated with class B 1030 is already running (e.g., a class initialization lock is not available), and thus, at 1004, after determining that blocking will not cause a deadlock, the thread associated with class A 1020 blocks. Determining that blocking will not cause a deadlock may involve, for example, examining a wait for graph and arriving at a dead end, rather than encountering a cycle.

At 1005, since class B 1030 depends on class A 1020 (see, e.g., class dependency code samples associated with FIG. 9), the thread associated with class B 1030 attempts to access the class initialization code associated with class A 1020. But at 1006, the present invention facilitates determining that if the thread associated with class B 1030 blocked at this point that a deadlock would exist. Determining that a deadlock would exist may involve wait for graph processing similar to that described in association with FIGS. 3 through 5, for example. Thus, at 1006, rather than blocking, and creating a deadlock (as is possible in conventional systems), the present invention can employ the "begin guarantee" technique and let the thread associated with class B 1030 return at 1007, exposing the partially initialized state of class A 1020. Thus, at 1008, the class initialization code associated with class B 1030 can complete. Such completion may further involve wait for graph processing similar to that described in association with FIGS. 3 through 5, for example. In one example of the present invention, a warning may be associated with the return at 1008 to indicate that the class B 1030 has been exposed to partially initialized state. In one example of the present invention, the component that caused the access of class B 1030 may then wait for a signal that the partially initialized state to which class B 1030 was exposed has been updated to a fully initialized status. Thus, rather than the class initialization method blocking at a point where a deadlock can be created, the component that caused the class initialization method to begin can determine whether it will proceed knowing that it has been exposed to partially initially state, and since the wait will occur after the class initialization method code has completed, the class initialization method code will not generate a deadlock.

At 1009, the block at 1004 is lifted, and since the thread associated with the access at 1002 ran to completion and thus the class B 1030 was initialized, the return at 1009 is undertaken with a completely initialized class B 1030. Thus, at 1010, class A can return. In one example of the present invention, the return at 1009 may have been accompanied with information that one or more classes were exposed to partially initialized state associated with class A 1020, and thus, the return 1010 may also include a signal that the state of class A 1020 has now been completely initialized. Thus, warnings made to components concerning their exposure to class A 1020 partially initialized state can be lifted.

Figure 11:
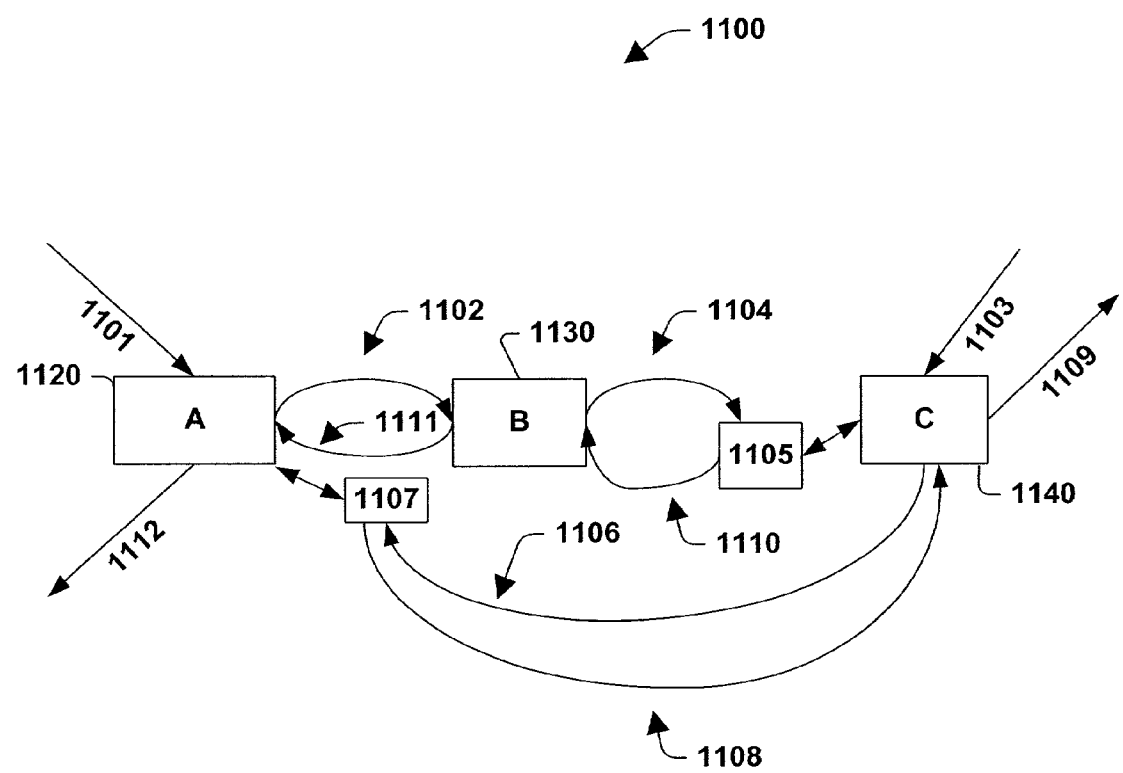
FIG. 11 is a timing diagram illustrating deadlock resolution between three threads where two threads are deadlocked, in accordance with an aspect of the present invention.

While FIG. 10 presents a deadlock involving two threads, it is to be appreciated that the present invention can be employed with more than two threads. Thus, FIG. 11 illustrates a call invocation sequence 1100 that demonstrates deadlock resolution between three threads where two threads can become potentially deadlocked. It is to be appreciated that deadlocks between a greater number of threads can be detected, prevented and/or resolved by the present invention.

At 1101, a first thread accesses a class A 1120, which causes class initialization code associated with class A 1120 to begin execution. At 1102, since class A 1120 depends on class B 1130 (see, e.g., class dependency examples associated with FIG. 9), the class initialization code associated with class A 1120 accesses class B 1130, which causes class initialization code associated with class B 1130 to begin execution. At 1103, a second thread accesses class C 1140, which causes class initialization code associated with class C 1140 to begin execution. At 1104, since class B 1130 depends on class C 1140 (see, e.g., class dependency examples associated with FIG. 9), the class initialization code associated with class B 1130 attempts to access class C 1140 and at 1105 the present invention facilitates detecting that the class initialization code associated with class C 1140 is already executing. For example, the invocation at 1104 may have attempted to acquire a class initialization lock associated with class C 1140 and may have been unable to acquire that lock since the thread associated with invocation 1103 had already acquired the lock. Thus, at 1105, the present invention facilitates determining that if the thread associated with invocation 1104 blocked, waiting for the initialization lock (and/or notice that class C 1240 was completely initialized) there would be no deadlock, at 1105, the thread may block. Determining that blocking the thread will not generate a deadlock may involve wait for graph processing similar to that described in association with FIGS. 3 through 5.

At 1106, since class C 1140 depends on class A 1120, (see, e.g., class dependency examples associated with FIG. 9), the class initialization code associated with class C 1140 attempts to access class A 1120. But at 1107, the present invention facilitates determining that the class initialization code associated with class A 1120 is already running. For example, invocation 1106 may have unsuccessfully attempted to acquire an initialization lock associated with class A 1120. Thus, at 1107, the present invention further facilitates determining that if the thread associated with the invocation 1106 blocked that a deadlock would be created. Detecting the potential deadlock may involve wait for graph processing similar to that associated with FIGS. 3 through 5, for example. Thus, at 1107, rather than block, the present invention permits the return at 1108, where the partially initialized state of class A 1120 is exposed to class C 1140. In one example of the present invention, the return at 1108 may include a warning that the class C 1140 is being exposed to partially initialized state. Since the class initialization code associated with class C 1140 is allowed to complete via 1108, the return at 1109 is permitted. Again, the return at 1109 may include a warning that the class C 1140 is being exposed to partially initialized state. The returns at 1108 and/or 1109 may include removing one or more arcs and/or nodes from a wait for graph, if the invocation at 1106 and/or the determination at 1107 added such arcs and/or nodes to a wait for graph.

With the return at 1109, the block at 1105 is lifted, and thus at 1110, the class initialization code associated with class B 1130 can complete. Again, the return at 1110 may include removing one or more arcs and/or nodes from a wait for graph, if the invocation at 1104 and/or the determination at 1105 added such arcs and/or nodes to a wait for graph. With the completion of the class initialization code associated with class B 1130, the return at 1111 is allowed, and thus, the class initialization code associated with class A 1120 can complete, permitting the return at 1112. In one example of the present invention, the return at 1112 may include a signal to components that were exposed to the partially initialized state of class A 1120 that class A 1120 has now been completely initialized.

In order to provide additional context for various aspects of the present invention, FIG. 12 and the following discussion are intended to provide a brief, general description of one possible suitable computing environment 1310 in which the various aspects of the present invention may be implemented. It is to be appreciated that the computing environment 1310 is but one possible computing environment and is not intended to limit the computing environments with which the present invention can be employed. While the invention has been described above in the general context of computer-executable instructions that may run on one or more computers, it is to be recognized that the invention also may be implemented in combination with other program modules and/or as a combination of hardware and software. Generally, program modules include routines, programs, components, data structures, etc. that perform particular tasks or implement particular abstract data types. Moreover, one will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

FIG. 12 illustrates one possible hardware configuration to support the systems and methods described herein. It is to be appreciated that although a standalone architecture is illustrated, that any suitable computing environment can be employed in accordance with the present invention. For example, computing architectures including, but not limited to, stand alone, multiprocessor, distributed, client/server, minicomputer, mainframe, supercomputer, digital and analog can be employed in accordance with the present invention.

With reference to FIG. 12, an exemplary environment 1310 for implementing various aspects of the invention includes a computer 1312, including a processing unit 1314, a system memory 1316, and a system bus 1318 that couples various system components including the system memory to the processing unit 1314. The processing unit 1314 may be any of various commercially available processors. Dual microprocessors and other multi-processor architectures also can be used as the processing unit 1314.

The system bus 1318 may be any of several types of bus structure including a memory bus or memory controller, a peripheral bus, and a local bus using any of a variety of commercially available bus architectures. The computer memory 1316 includes read only memory (ROM) 1320 and random access memory (RAM) 1322. A basic input/output system (BIOS), containing the basic routines that help to transfer information between elements within the computer 1312, such as during start-up, is stored in ROM 1320.

The computer 1312 may further include a hard disk drive 1324, a magnetic disk drive 1326, e.g., to read from or write to a removable disk 1328, and an optical disk drive 1330, e.g., for reading a CD-ROM disk 1332 or to read from or write to other optical media. The hard disk drive 1324, magnetic disk drive 1326, and optical disk drive 1330 are connected to the system bus 1318 by a hard disk drive interface 1334, a magnetic disk drive interface 1336, and an optical drive interface 1338, respectively. The computer 1312 typically includes at least some form of computer readable media. Computer readable media can be any available media that can be accessed by the computer 1312. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer 1312. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM 1322, including an operating system 1340, one or more application programs 1342, other program modules 1344, and program non-interrupt data 1346. The operating system 1340 in the computer 1312 can be any of a number of commercially available operating systems.

A user may enter commands and information into the computer 1312 through a keyboard 1348 and a pointing device, such as a mouse 1350. Other input devices (not shown) may include a microphone, an IR remote control, a joystick, a game pad, a satellite dish, a scanner, or the like. These and other input devices are often connected to the processing unit 1314 through a serial port interface 1352 that is coupled to the system bus 1318, but may be connected by other interfaces, such as a parallel port, a game port, a universal serial bus ("USB"), an IR interface, etc. A monitor 1354, or other type of display device, is also connected to the system bus 1318 via an interface, such as a video adapter 1356. In addition to the monitor, a computer typically includes other peripheral output devices (not shown), such as speakers, printers etc.

The computer 1312 may operate in a networked environment using logical and/or physical connections to one or more remote computers, such as a remote computer(s) 1358. The remote computer(s) 1358 may be a workstation, a server computer, a router, a personal computer, microprocessor based entertainment appliance, a peer device or other common network node, and typically includes many or all of the elements described relative to the computer 1312, although, for purposes of brevity, only a memory storage device 1360 is illustrated. The logical connections depicted include a local area network (LAN) 1362 and a wide area network (WAN) 1364. Such networking environments are commonplace in offices, enterprise-wide computer networks, intranets and the Internet.

When used in a LAN networking environment, the computer 1312 is connected to the local network 1362 through a network interface or adapter 1366. When used in a WAN networking environment, the computer 1312 typically includes a modem 1368, or is connected to a communications server on the LAN, or has other means for establishing communications over the WAN 1364, such as the Internet. The modem 1368, which may be internal or external, is connected to the system bus 1318 via the serial port interface 1352. In a networked environment, program modules depicted relative to the computer 1312, or portions thereof, may be stored in the remote memory storage device 1360. It will be appreciated that the network connections shown are exemplary and other means of establishing a communications link between the computers may be used.

Figure 13:
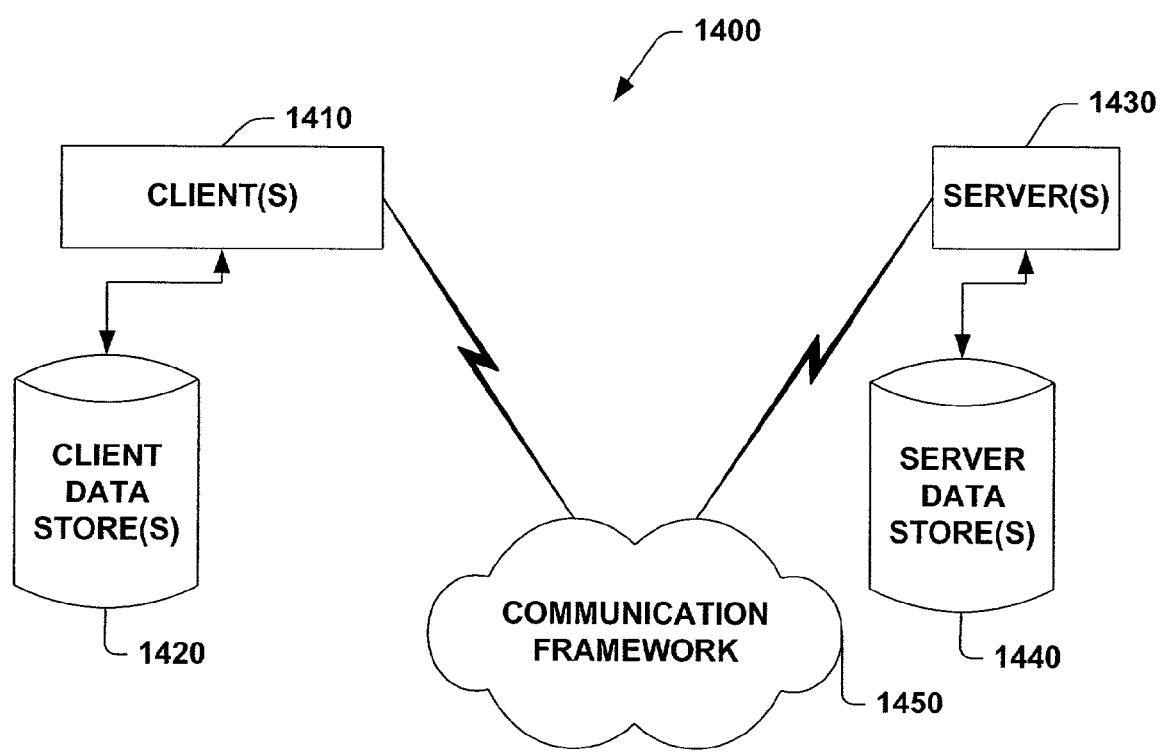
FIG. 13 is a schematic block diagram of an exemplary communication environment for a method performing in accordance with the present invention.

FIG. 13 is a schematic block diagram of a sample computing environment 1400 with which the present invention may interact. The system 1400 includes one or more clients 1410. The clients 1410 may be hardware and/or software (e.g., threads, processes, computing devices). The system 1400 also includes one or more servers 1430. The servers 1430 may also be hardware and/or software (e.g., threads, processes, computing devices).

The system 1400 includes a communication framework 1450 that can be employed to facilitate communications between the clients 1410 and the servers 1430. The clients 1410 are operably connected to one or more client data stores 1415 that can be employed to store information local to the clients 1410. Similarly, the servers 1430 are operably connected to one or more server data stores 1440 that can be employed to store information local to the servers 1430.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer system for mitigating problems associated with automatic execution of initialization code by a processing unit, the system comprising the following computer executable components stored on a computer storage media:
   an initialization method activator that calls a class initialization method at a pre-determined execution point;
   a deadlock analyzer that determines whether running the class initialization method will produce a deadlock;
   a semantic analyzer that analyzes a semantic type associated with the class initialization method, where the semantic analyzer provides information concerning a desired initialization check time to the initialization method activator; and
   a domain uniqueness analyzer that analyzes the uniqueness of one or more domains with which the class initialization method and/or the class will interact, where the uniqueness analyzer provides information concerning a desired initialization check time to the initialization method activator.

2. The system of claim 1, where the initialization method activator checks whether a class is initialized and, if the class is not initialized, calls the class initialization method.

3. The system of claim 2, where the deadlock analyzer determines whether running the class initialization method will generate a deadlock.

4. The system of claim 3, where the pre-determined execution point is at least one of a caller's just in time compilation time, a callee's just in time compilation time, an initial field access time, an initial method access time, an initial static field access time and a first access of pre-compiled code where no just in time compilation occurs.

5. The system of claim 1, where the initialization method activator associates initialization check code with one or more components associated with a runtime environment, where the initialization check code determines whether a class has been initialized.

6. The system of claim 5, where the initialization check code determines whether calling the class initialization method will generate a deadlock, and if a deadlock will be generated, to resolve the deadlock.

7. The system of claim 6, where the initialization check code is run at one of a caller's just in time compilation time, a callee's just in time compilation time, a first field access time, a first method access time, a first static field access time and a first access of pre-compiled code where no just in time compilation occurs.

8. The system of claim 1, where the deadlock analyzer analyzes a wait for graph.

9. The system of claim 8, where the deadlock analyzer resolves a deadlock associated with running the class initialization method.

10. The system of claim 9, where the deadlock analyzer adds and/or removes one or more nodes and/or arcs from the wait for graph.

11. The system of claim 1, where the semantic type is one of "exact" and "before field initialization".

12. The system of claim 1, where the domain uniqueness is one of "normal" and "domain neutral".

13. A computer readable storage medium containing computer executable components of a system for mitigating problems associated with automatic execution of initialization code, the computer executable components comprising:
an initialization method activating component that calls the class initialization method at a pre-determined execution point;
a deadlock analyzer that determines whether running the class initialization method will produce a deadlock; and
a semantic analyzer that analyzes a semantic type associated with the class initialization method, where the semantic analyzer provides information concerning a desired initialization check time to the initialization method activating component, the semantic type is one of "exact" and "before field initialization".

14. A computer readable storage medium containing computer executable components of a system for mitigating problems associated with automatic execution of initialization code, the computer executable components comprising:
a semantic analyzing component that determines a semantic type associated with the initialization method;
a domain uniqueness analyzing component that determines a uniqueness type associated with one or more application domains with which the class will interact;
a deadlock analyzing component that determines whether calling the initialization method will create a deadlock and resolves the deadlock; and
an initialization method activating component that calls the initialization method at a pre-determined execution point, where the pre-determined execution point depends on, at least in part, the semantic type and the domain uniqueness.

15. A computerized method for mitigating problems associated with automatic execution of class initialization code, the method comprising:
determining whether a class has an initializing method;
determining when the initializing method should be run;
associating initialization check code with one or more components associated with a runtime, the check code determines whether a class is initialized;
determining whether calling the initializing method will generate a deadlock and if calling the initializing method will generate a deadlock, resolving the deadlock;
analyzing semantic information associated with the initializing method, the semantic information comprises an identifier that identifies whether the initializing method desires "exact" or "before field initialization" behavior; and
calling the class initializing method.

16. The method of claim 15, where determining when the initializing method should be run further comprises analyzing domain uniqueness information associated with one or more domains with which the class initialization code will interact.

17. The method of claim 16, where the domain uniqueness information comprises an identifier that identifies whether the initializing method is associated with a "normal" or a "domain neutral" environment.

18. The method of claim 15, where determining whether calling the initializing method will generate a deadlock comprises:
attempting to acquire an initialization lock associated with the class to be initialized, and if the initialization lock cannot be acquired, identifying a holding thread that is holding the initialization lock;
locating a node associated with the holding thread, where the node is located in a wait for graph; and
analyzing the wait for graph to determine whether a deadlock exists.

19. The method of claim 18, where analyzing the wait for graph to determine whether a deadlock exists comprises traversing the wait for graph starting at the node associated with the holding thread and determining whether a cycle is detected in the wait for graph.

20. The method of claim 19, where resolving the deadlock comprises:
acquiring a lock associated with the wait for graph;
if a detecting thread that identifies the deadlock previously added one or more arcs and/or nodes to the wait for graph, removing the one or more arcs and/or nodes from the wait for graph;
releasing the lock associated with the wait for graph; and
the detecting thread interacting with the class as though the class was initialized.

21. The method of claim 15, where determining whether calling the initializing method will generate a deadlock comprises:
an acquiring thread attempting to acquire an initialization lock associated with the class to be initialized, and, if the lock can not be acquired, determining whether there is a thread waiting for the acquiring thread to complete its processing and release the initialization lock.

22. The method of claim 21, where resolving the deadlock comprises:
if it was determined that there was a thread waiting for the acquiring thread to complete its processing and release the initialization lock, then returning and interacting with the partially initialized state of the class as though the class were initialized, otherwise, blocking until the class becomes initialized.

23. A computer readable storage medium containing computer executable instructions that perform a method for mitigating problems associated with automatic execution of class initialization code, the method comprising:
determining whether a class has an initializing method;
determining when the initializing method should be run;
inserting initialization check code into one or more components associated with a runtime;
determining whether calling the initializing method will generate a deadlock and if calling the initializing method will generate a deadlock, resolving the deadlock;
analyzing semantic information associated with the initializing method, the semantic information comprises an identifier that identifies whether the initializing method desires "exact" or "before field initialization" behavior; and calling the class initializing method.

24. A computerized method for mitigating problems associated with automatic execution of class initialization code, the method comprising:

determining whether a class has an initializing method;

determining when the initializing method should be run, where determining when the initializing method should be run comprises:

analyzing semantic information associated with the initializing method, where the semantic information comprises an identifier that identifies whether the initializing method desires "exact" or "before field initialization" behavior; and analyzing domain uniqueness information associated with one or more domains with which the initializing method will interact, where the domain uniqueness information comprises an identifier that identifies whether the initializing method is operating in a "normal" or a "domain neutral" environment;

associating initialization check code with one or more components associated with a runtime;

determining whether calling the initializing method will generate a deadlock;

resolving the deadlock; and calling the class initializing method.

25. The method of claim 24, where determining whether calling the initializing method will generate a deadlock comprises:

attempting to acquire an initialization lock associated with the class to be initialized, and if the initialization lock cannot be acquired, identifying a holding thread that is holding the initialization lock;

locating a node associated with the holding thread, where the node is located in a wait for graph; and analyzing the wait for graph to determine whether a deadlock exists, where analyzing the wait for graph to determine whether a deadlock exists comprises:

traversing the wait for graph starting at the node associated with the holding thread and determining whether a cycle is detected in the wait for graph.

26. The method of claim 25, where resolving the deadlock comprises:

acquiring a lock associated with the wait for graph;

if the thread that identifies the deadlock previously added one or more arcs and/or nodes to the wait for graph, removing the one or more arcs and/or nodes from the wait for graph;

releasing the lock associated with the wait for graph; and in the thread that detected that it could not initialize the class because a deadlock existed with another thread that was initializing the class, interacting with the class as though it was initialized.

27. A computer readable storage medium containing computer executable instructions for performing a method for mitigating problems associated with automatic execution of class initialization code, the method comprising:

determining whether a class has an initializing method;

determining when the initializing method should be run, where determining when the initializing method should be run comprises:

analyzing semantic information associated with the initializing method, where the semantic information comprises an identifier that identifies whether the initializing method desires "exact" or "before field initialization" behavior; and analyzing domain uniqueness information associated with one or more environments with which the initializing method will interact, where the domain uniqueness information comprises an identifier that identifies whether the initializing method will interact with a "normal" or a "domain neutral" environment;

associating initialization check code with one or more components associated with a runtime;

determining whether calling the initializing method will generate a deadlock;

resolving the deadlock; and calling the class initializing method.

28. A system for mitigating problems associated with automatic execution of class initialization code, the system comprising:

means for identifying a constructor associated with a class;

means for scheduling the running of the constructor;

means for adding code into one or more components generated by a runtime, the code identifies whether a class is initialized;

means for detecting deadlocks between constructors;

means for resolving deadlocks between constructors;

means for analyzing semantic type associated with the class initialization method, where the semantic analyzer provides information concerning desired initialization check time to the initialization method, the semantic type is one of "exact" and "before field initialization";

means for invoking a constructor.

* * * * *